United States Patent Office 2,842,732
Patented July 8, 1958

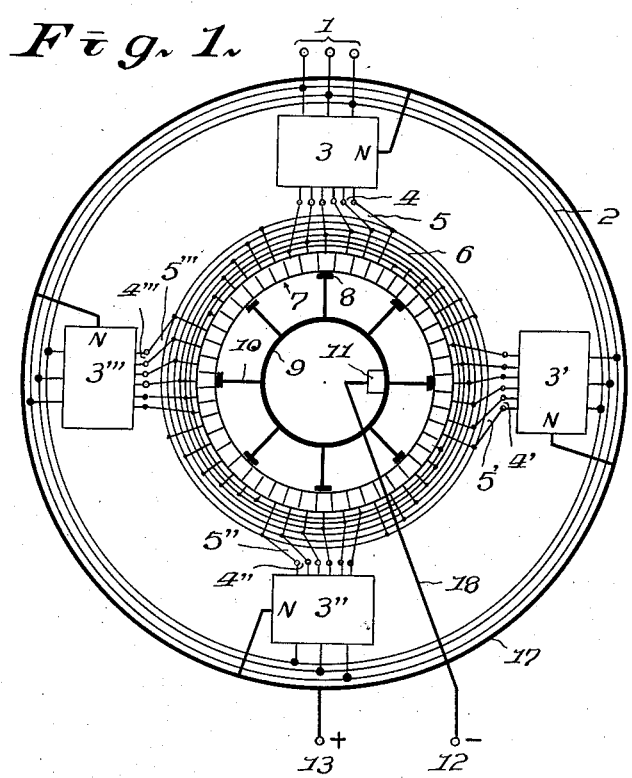

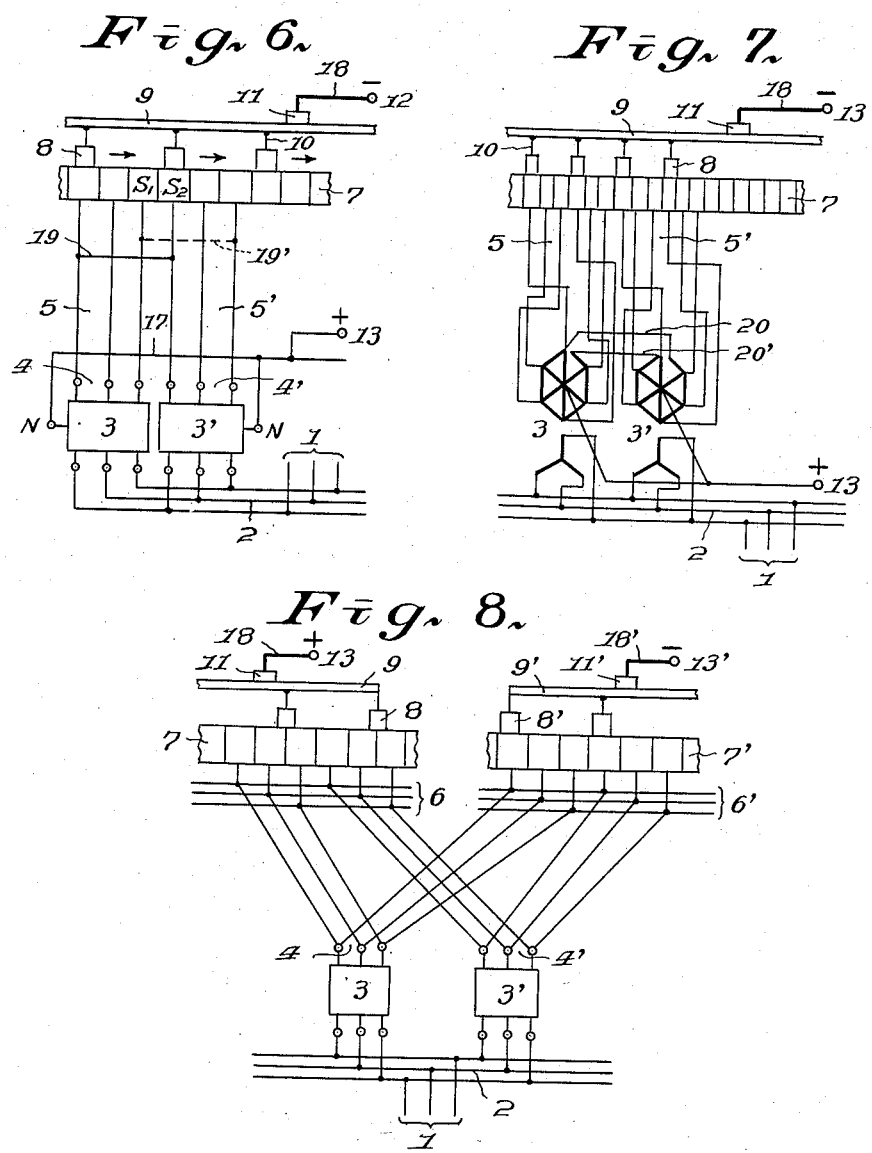

2,842,732

ROTARY BRUSH TYPE COMMUTATOR-CONVERTER

Yasube Kasugai, Ichimiya-shi, Aichi-ken, Japan, assignor to Kabushiki-Kaisha Chuo Seisakusho, Mizufo-ku, Nagoya-shi, Japan, a Japanese company Application May 13, 1953, Serial No. 354,718

Claims priority, application Japan September 5, 1952

4 Claims. (Cl. 321—5)

This invention relates to an improvement of a rotary brush type commutator-converter.

The electric commutator-converter, which is able to convert alternating current into direct current and consists of a transformer capable of transforming primary three phase voltages into secondary polyphase voltage, for example, 6, 12 or 24 phase voltage, a stationary commutator being fed with said transformed polyphase current and rotary brushes being in contact with said commutator and being rotated at a speed synchronous to that of the rotary field generated by said polyphase current, has been well-known as a rotary brush type commutator-converter.

In the former commutator-converter as described above, it has been the practice to use only one transformer per one commutator to feed the commutator with polyphase current.

According to such converter, however, the reactance voltage in the commutating circuit increases in proportion to the increase of output capacity of the converter resulting in limitation of output capacity of the converter due to spark commutation, so that it is impossible to manufacture a rotary brush type commutator-converter of specially large output capacity.

Said limitation is due to the following fact. That is, the greater part of the reactance voltage in the commutating circuit is induced by leakage inductance of the transformer and the inductance of the conductors connecting the commutator with the transformer, the latter inductance being proportional to the length of said conductors. However, from the economical and technical points of view in design of the transformer and in connecting technique of the conductors, it is very difficult to reduce both of said inductances within a certain value less than a definite minimum value. Accordingly, there is a lowest limitation in the resultant of said inductances. On the other hand, the leakage inductance of the transformer increases in proportion to the increase of the output capacity of the transformer and also the inductance of the conductors connecting the commutator with the transformer increases mainly in proportion to increase of the distance between one and the other of said conductors, said distance being proportionate to increase of load current. Generally, said reactance voltage is proportionate to product of the resultant of said inductances and the load current so far as the commutating period is constant, so that said reactance voltage increases along a sharp curve in proportion to increase of output power or load current.

Therefore, the output capacity of former commutator-converter consisting of a transformer, a commutator and rotary brushes as described above has been limited within a relatively small capacity.

Of course, for the purpose of increasing output capacity of the converter as described above, another type provided with two groups, each thereof being consisted of one transformer and one commutator and both of them being connected in parallel at their direct current sides to each other, was manufactured. This latter type of converter, however, has various defects since the length of the machine becomes too long due to the increase of commutator number, some phase difference occurs between the brushes belonging to one commutator and the other brushes belonging to the other commutator, the driving-shaft oscillates due to unbalance and other mechanical difficulties occur owing to the largeness of the mounting surface and costs increase.

Therefore, the object of this invention is to improve the rotary brush type commutator-converter as described above so that it may be very good in commutation and very large in output capacity without the accompanying defects as described above.

Said object of this invention has been accomplished by feeding one commutator with polyphase current led from secondary terminals of several transformers through respective connecting conductors, said transformers being supplied from same alternating current source at their primary sides.

Said object, and other objects and principles of this invention will be more clearly understood by reference to the following detailed description in connection with the examples illustrated in the accompanying drawings, wherein:

Fig. 1 is a diagrammatic plan view of an example of this invention, in which four transformers are used.

Fig. 2 is a diagrammatic sectional elevation corresponding to the example illustrated in Fig. 1, actual arrangement and connection of various parts thereof being taken so as to differ somewhat from those in Fig. 1 for the purpose of their simplification.

Each of Figs. 4–8 is a partial connection diagram corresponding to the diagram of Fig. 3 and belonging to other different example of this invention, but the examples in Figs. 4, 5, 6 and 8 are illustrated in connection with the case, in which transformers provided with three-phase secondary are used.

Figure 3:
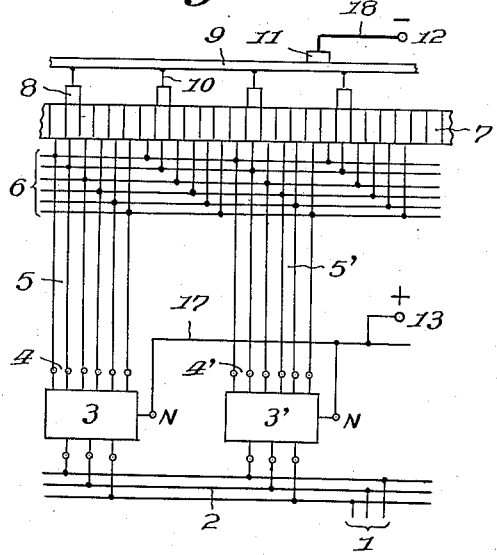
Fig. 3 is a partial connection diagram of the example illustrated in Figs. 1 and 2, said view being used for explaining intelligibly the principle of this invention.

Referring to Figs. 1–3, several transformers 3, 3', 3" and 3''' capable of transforming primary three-phase voltage into six-phase voltage suitable for commutation are connected at their primary terminals with primary bus bars 2 being fed from three-phase source 1, connected at their secondary terminal 4, 4', 4" and 4''' with current distributing ring conductors 6 through respective connecting conductors 5, 5', 5" and 5''' and connected at their neutral points N with a plus terminal 13 of commutated voltage through a bus bar 17, through said ring conductors being fed the secondary voltage of said transformers into only one stationary commutator 7. The rotary brushes 8 are supported by brush holders 16 so that they may be rotated under condition being in contact with the commutator 7 and being synchronous to the phase rotation of the secondary voltage of said transformers, said brush holders being rotated by the revolving shaft 14 of a synchronous motor 15. On said shaft 14 is attached a slip ring 9, from which a minus terminal 12 of commutated voltage being led through a conductor 18 and a stationary brush 11. Said slip ring 9 and rotary brushes 8 are connected by conductors 10 to each other.

In the example illustrated in Figs. 1–3, if the rotary brushes 8 are rotated under condition being in contact with the commutator 7 at a speed synchronous to the phase rotation of the secondary voltage of the transformers 3, 3', 3" and 3''', a commutated direct current voltage generates between the rotary brushes 8 and the neutral points N of said transformers, that is, between the terminals 12 and 13.

According to the example as described above, the load current will be divided into several currents in the transformers 3, 3', 3" and 3"', output capacity of each transformer becomes equal to $$\frac{\text{Output capacity of converter}}{\text{Number of transformers}}$$

and the current in the conductors 5, 5', 5", 5"' becomes equal to $$\frac{\text{Output current of the converter}}{\text{Number of used transformers}}$$

so that if output capacity of each transformer is selected so that reactance voltage in every commutating circuit may be maintained within the voltage allowable for good commutation, it becomes possible by using transformers of appropriate number to manufacture, in easy and economical manner, a rotary brush type commutator-converter of very large capacity and good commutation.

In the example illustrated in Figs. 1–3, number of pole pair in the commutator is twofold of that of the transformers, but multiple proportion as above may be selected in any other proportion, for example, one, three, four and etc.

Furthermore, the example illustrated in Figs. 1–3 may be modified in other manner, for example, the ring conductors 6 may be arranged close to the secondary terminals 4, 4', 4" and 4"' of the transformers and also the connecting conductors 5, 5', 5" and 5"' belonging to same phase may be connected with same point or adjacent two points in the ring conductors 6.

In the following examples illustrated in Figs. 4–8, same numerals as those in Figs. 1–3 denote same parts, so that following description is made in connection with only parts necessary for describing the modified parts.

Figure 4:
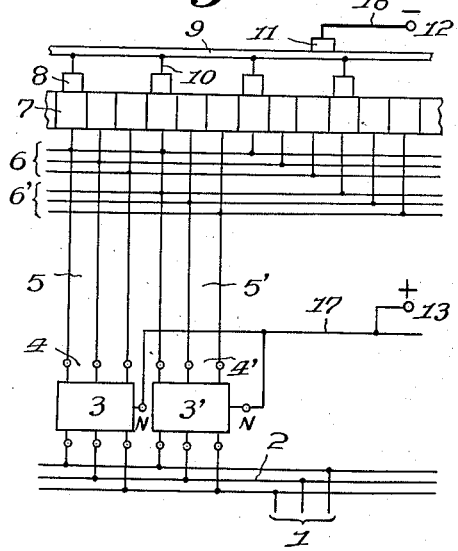

In Fig. 4 is shown an example, in which the commutator segments are grouped in several groups, in this example being shown the case of two groups, and transformers and ring conductors are grouped in groups of same number as that of said groups of commutator segments, in each group consisting of commutator segments, ring conductors and transformers being adapted the feeding method as same as the case of the example illustrated in Figs. 1–3.

In the example in Fig. 4, each group consisting of transformers, current distributing ring conductors and connecting conductors between them may be substituted by similar several groups which are connected in parallel with each other.

Figure 5:
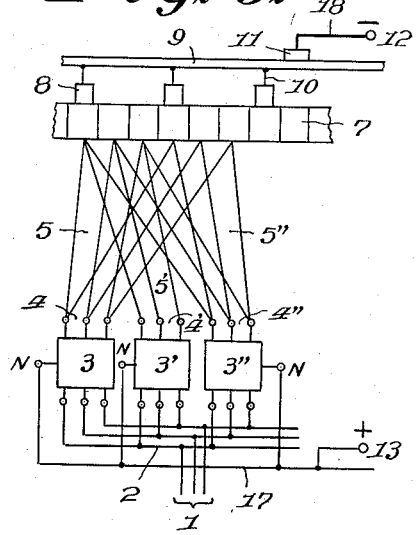

The example illustrated in Fig. 5 relates to the case, in which the current distributing ring conductors 6 are omitted and the commutator 7 is fed directly by transformers 3, 3', 3" and etc. through their connecting conductors 5, 5', 5" and etc.

The example illustrated in Fig. 6 relates to the case, in which one transformer is used per one pole pair of commutator segments. In such case, when the rotary brushes 8 move during their rotation in the arrow direction from the last segment $S_1$ of the commutator segments connected with the transformer 3 to the first segment $S_2$ of the commutator segments connected with the transformer 3', the inductance of the commutating circuit between the segments $S_1$ and $S_2$ becomes relatively large resulting in occurrence of commutation spark.

Said defect, however, may be effectively reduced by the cross-conductor 19. Said conductor 19 may be substituted by other cross-conductor 19' shown by broken line. It may be allowable to use both of said conductors 19 and 19'. The position of said conductor 19 or 19' is free, so that they may be arranged close to the commutator 7 or close to the secondary terminals of the transformers.

The example illustrated in Fig. 6 may be modified as illustrated in Fig. 7 so that secondary windings of the transformers 3 and 3' may be connected by cross-conductors 20 and 20' instead of said cross-conductor 19 or 19' in Fig. 6.

The example illustrated in Fig. 8 is almost same with that illustrated in Figs. 1–3 except that the commutator, current distributing ring conductors and rotary brushes are divided respectively into two groups 7, 7' and 6, 6' and 8, 8', from said brushes 8 being led a plus terminal 13 through a slip ring 9, stationary brush 11 and conductor 18 and from said brushes 8' being led a minus terminal 13' through a slip ring 9', stationary brush 11 and conductor 18'.

As a whole, it is a principal element of this invention to limit the output capacity of one transformer so that the reactance voltage thereof may be limited within the value allowable for commutation, to use several transformers necessary for obtaining output capacity of the commutator-converter and to connect said transformers at their secondary terminals with a common commutator through respective connecting conductors.

For the purpose of reducing the reactance voltage in the transformer, hitherto it has been usual to use several transformers instead of one and to connect all secondary terminals of same phase in all transformers by bus bars and to feed a common commutator by said bus bars, but in this case the reactance voltage in the conductors connecting said transformers with commutator will not be reduced.

In this invention, however, the secondary currents of the transformers are not collected until coming on the commutator and are directly fed to each of the commutator segments as they are or under divided condition resulting in diminution of reactance voltage in the circuit between every two adjacent commutator segments.

Since it is evident that many changes and modifications can be made in the above described details of this invention without departing from the nature and spirit of this invention, it is to be understood that this invention is not limited within the above description.

Having thus described my invention, I claim:

1. A rotary brush type commutator-converter apparatus comprising a plurality of transformers connected in parallel and each constructed for transforming three-phase input voltages into at least six-phase output voltages, a commutator having a plurality of segments, rotary brushes in contact with said commutator, means for rotating said brushes synchronously with the phase rotation of the output voltages of said transformers, each of said transformers having a selected output capacity and a secondary terminal for each output phase and the output capacity of each transformer being of a selected value to allow for construction of a rotary brush type commutator-converter having a selected large output capacity while maintaining reactance voltage in said apparatus at a selected reduced value for optimum communtation, and conductor means separately connecting individual secondary terminal outputs to individual segments in said commutator thereby to maintain the current in each of said conductor means along the whole length thereof less than the output current of the apparatus and the reactance voltage at a selected reduced value, whereby commutation is effected without sparking.

2. A rotary brush type commutator-converter apparatus comprising a plurality of transformers connected in parallel and each constructed for transforming three-phase input voltages into at least six-phase output voltages, a commutator having a plurality of segments, rotary brushes in contact with said commutator, means for rotating said brushes synchronously with the phase rotation of the output voltages of said transformers, each of said transformers having a selected output capacity and a secondary terminal for each output phase and the output capacity of each transformer being of a selected value to allow for construction of a rotary brush type commutator-converter having a selected large output capacity while maintaining reactance voltage in said apparatus at a selected reduced value for optimum commutation, and conductor means separately connecting individual secondary terminal outputs to individual segments in said commutator thereby to maintain the current in each of said conductor means along the whole length thereof less than the output current of the apparatus and the reactance voltage at a selected reduced value, some of said conductor means being connected to two adjacent segments each of which is connected to different and next adjacent transformers, and cross-conductor means connecting at least one of said conductor means connected to one of said adjacent segments and one of said transformers to a corresponding phase of the other adjacent transformer thereby to reduce inductance at least between said adjacent conductor means and eliminate sparking when said adjacent segments are short-circuited by a rotary brush.

3. A rotary brush type commutator-converter apparatus comprising a plurality of transformers connected in parallel and each constructed for transforming three-phase input voltages into at least six-phase output voltages, a commutator having a plurality of segments, rotary brushes in contact with said commutator, means for rotating said brushes synchronously with the phase rotation of the output voltages of said transformers, each of said transformers having a selected output capacity and a secondary terminal for each output phase and the output capacity of each transformer being of a selected value to allow for construction of a rotary brush type commutator-converter having a selected large output capacity while maintaining reactance voltage in said apparatus at a selected reduced value for optimum commutation, and conductor means separately connecting individual secondary terminal outputs to individual segments in said commutator thereby to maintain the current in each of said conductor means along the whole length thereof less than the output current of the apparatus and the reactance voltage at a selected reduced value, and cross-conductor means cross-connecting the corresponding conductor mans connecting at least the first phase and the last phase of next adjacent transformers to individual segments thereby to reduce inductance at least between conductor means associated with said adjacent transformers.

4. A rotary brush type commutator-converter apparatus comprising a plurality of transformers connected in parallel and each constructed for transforming three-phase input voltages into at least six-phase output voltages, a commutator having a plurality of segments, rotary brushes in contact with said commutator, means for rotating said brushes synchronously with the phase rotation of the ouput voltages of said transformers, each of said transformers having secondary windings and a selected output capacity with a secondary terminal for each output phase and the output capacity of each transformer being of a selected value to allow for construction of a rotary brush type commutator-converter having a selected large output capacity while maintaining reactance voltage in said apparatus at a selected reduced value for optimum commutation, current-distributor rings, conductor means for separately connecting individual secondary terminal outputs to individual segments in said commutator thereby to maintain the current in each of said conductor means along the whole length thereof less than the output current of the apparatus and the reactance voltage at a selected reduced value, said conductor means comprising means connecting corresponding transformer output phases to common distributor rings and means connecting distributor rings associated with a given phase of a given transformer with at least two spaced selected segments in the commutator, whereby said current-distributor rings serve as cross-conductors reducing inductance between adjacent conductor means and associated transformer secndary windings and commutator segments.

References Cited in the file of this patent

UNITED STATES PATENTS

| | | |
|---|---|---|
| 1,191,759 | Cabot | July 18, 1916 |
| 1,286,587 | Girvin | Dec. 3, 1918 |
| 1,554,711 | Cabot | Sept. 22, 1925 |
| 2,184,309 | Leukert | Dec. 26, 1939 |
| 2,301,752 | Schulze | Nov. 10, 1942 |
| 2,340,098 | Zuhlke | Jan. 25, 1944 |